(12) United States Patent
Padula

(10) Patent No.: US 11,549,691 B2
(45) Date of Patent: Jan. 10, 2023

(54) OVEN WITH ENHANCED AIR FLOW SYSTEM AND METHOD

(71) Applicant: Alto-Shaam, Inc., Menomonee Falls, WI (US)

(72) Inventor: Cory F. Padula, Chilliwack (CA)

(73) Assignee: Alto-Shaam, Inc., Menomonee Falls, WI (US)

( * ) Notice: Subject to any disclaimer, the term of this patent is extended or adjusted under 35 U.S.C. 154(b) by 398 days.

(21) Appl. No.: 16/815,220

(22) Filed: Mar. 11, 2020

(65) Prior Publication Data

US 2020/0208847 A1 Jul. 2, 2020

Related U.S. Application Data

(63) Continuation of application No. 15/378,588, filed on Dec. 14, 2016, now Pat. No. 10,598,391.

(60) Provisional application No. 62/322,837, filed on Apr. 15, 2016.

(51) Int. Cl.
| | |
|---|---|
| F24C 15/16 | (2006.01) |
| F24C 15/18 | (2006.01) |
| F24C 15/32 | (2006.01) |
| A21B 1/26 | (2006.01) |
| F24C 15/34 | (2006.01) |
| F24C 15/20 | (2006.01) |
| F24C 15/08 | (2006.01) |
| F24C 15/02 | (2006.01) |

(52) U.S. Cl.
CPC .......... *F24C 15/322* (2013.01); *F24C 15/16* (2013.01); *F24C 15/32* (2013.01); *F24C 15/34* (2013.01); *A21B 1/26* (2013.01); *F24C 15/02* (2013.01); *F24C 15/08* (2013.01); *F24C 15/2007* (2013.01)

(58) Field of Classification Search
None
See application file for complete search history.

(56) References Cited

U.S. PATENT DOCUMENTS

| | | |
|---|---|---|
| 1,345,107 A | 6/1920 | Rinck |
| 3,716,687 A | 2/1973 | Constable |
| 3,920,944 A | 11/1975 | Constable |
| 4,491,065 A * | 1/1985 | Poulson ............... A47J 37/047 34/604 |
| 4,942,288 A | 7/1990 | Worsham et al. |
| 5,148,737 A | 9/1992 | Poulson |
| 5,471,972 A | 12/1995 | Corliss, II et al. |
| 5,695,668 A | 12/1997 | Boddy |
| 5,872,351 A | 2/1999 | Sowerby |
| 2004/0123858 A1* | 7/2004 | McFadden .......... H05B 6/6485 219/400 |

(Continued)

FOREIGN PATENT DOCUMENTS

| | | |
|---|---|---|
| DE | 201 01 501 | 4/2001 |
| EP | 1 172 022 | 1/2002 |
| JP | 2000 210005 | 8/2000 |

*Primary Examiner* — Joseph M. Pelham
(74) *Attorney, Agent, or Firm* — Boyle Fredrickson S.C.

(57) ABSTRACT

A high thermal mass cooking oven with an oven compartment having multiple high thermal mass cooking racks spaced in parallel opposition but close proximity is provided. A large blower allows a large amount of heated air to enter the cooking compartment and be retained by the oven compartment walls and cooking racks. The cooking racks are more massive than a typical oven and provide high conductivity and emissivity.

19 Claims, 6 Drawing Sheets

(56) References Cited

U.S. PATENT DOCUMENTS

| | | |
|---|---|---|
| 2004/0211765 A1 | 10/2004 | McFadden |
| 2005/0258161 A1 | 11/2005 | Nooh |
| 2007/0295322 A1 | 12/2007 | Dobie et al. |
| 2009/0025704 A1* | 1/2009 | Padula .................. F24C 15/322 126/21 A |
| 2012/0321770 A1 | 12/2012 | Pelle |
| 2013/0168378 A1 | 7/2013 | Collins |
| 2017/0010005 A1* | 1/2017 | Tomoda .................. F22G 1/165 |
| 2017/0211819 A1* | 7/2017 | McKee ................ F24C 15/322 |
| 2019/0056118 A1* | 2/2019 | McKee ................ F24C 15/322 |

* cited by examiner

OVEN WITH ENHANCED AIR FLOW SYSTEM AND METHOD

CROSS-REFERENCE TO RELATED APPLICATIONS

This application is a continuation of U.S. application Ser. No. 15/378,588, filed Dec. 14, 2016, which claims the benefit of U.S. provisional application 62/322,837, filed Apr. 15, 2016, each of which is hereby incorporated by reference.

BACKGROUND OF THE INVENTION

The present invention relates to a commercial cooking apparatus, and in particular, to a high velocity turbulent air oven with high thermal mass.

In the commercial food service industry there is a need for faster cooking so that the food service establishment may serve a greater amount of patrons at a faster rate. High speed ovens offer a solution to increase the food service establishments' efficiency and speed of service for certain food products. "Hybrid" speed cooking ovens utilized microwave or radiant enhancement to improve the speed of cooking of convection, radiant or steam cooking ovens. Microwave energy can speed up the cooking rates of conventional convection or steam cooking ovens by sending microwave radiation through the food product thus rotating and agitating the molecules within the food product. Radiant heating which sends infrared radiation from nearby heating elements, such as calrod heaters, also agitate the molecules within the food product to speed up cooking. Other speed cooking ovens have been developed which use convection heating alone, without microwave energy, to provide high-speed cooking for a single rack of food, commonly found in conveyor type cooking ovens.

Convection ovens providing high-speed cooking with or without the addition of microwave energy, typically includes a blower or fan for circulating heated air through the heat chamber. The oven typically includes a cooking rack or tray holding the food product and allowing the circulating heated air to flow through the cooking rack to heat the food.

One of the challenges of high-speed convection cooking is that the oven must achieve fast cooking of the food product without burning the outside of the food product but still create a desired crispness, for example, when cooking pizza or other bread-based items which desire a moist inside and crisp outer crust. The criteria for cooking is complicated by the fact that the circulation of air cannot disrupt the contents of the food product, such as the toppings of a pizza, but still introduce enough heat into the oven cavity for proper cooking. Moreover, it is difficult to accommodate multiple cooking racks within the oven with the challenge of hotspots created by the racks interfering with the air flow. Normally, the cooking of either the top or bottom of the food product is compromised by the addition of a second or third shelf creating cold spots.

SUMMARY OF THE INVENTION

The present inventors have recognized that introducing multiple high thermal mass cooking racks into a high thermal mass oven cavity with close separation between the racks allows for heat circulated by the blower to be retained within the racks and cavity walls allowing the cooking product to be evenly cooked on a top and bottom of the food product.

Accordingly, the present invention provides a high thermal mass oven cavity having multiple high thermal mass cooking racks positioned therein in close separation. A large blower allows a large amount of heat to enter and be retained by the cooking cavity. The material of the oven cavity and cooking racks absorb the heat from the circulated air to cook the food in the cooking regions between shelving and walls.

In one embodiment, the present invention is a high velocity turbulent air oven having housing walls including a door closing to define an interior cooking cavity and opening to provide access to the cooking cavity; a cooking cavity heater communicating with the cooking cavity to heat the cooking cavity; a blower for circulating heated air through the cooking cavity; a first shelf spaced from the housing walls and horizontally disposed within the cooking cavity; and a second shelf spaced from the housing walls and the first shelf and disposed within the cooking cavity and spaced in substantially parallel separation from the first shelf. The first and second shelves, respectively, may have an areal density of at least six pounds per square foot or at least eight pounds per square foot or at least ten pounds per square foot. The first and second shelves, respectively, may have a specific heat capacity of at least 460 J/kg° C.

It is thus a feature of at least one embodiment of the invention to provide high intensity cooking regions between heavy plates of high thermal mass material to provide turbulent air cooking of the food therebetween.

The first and second shelves, respectively, may have a thermal conductivity and emissivity at least 70 percent of that provided by raw cast iron and/or steel. The first and second shelves may be made of cast iron or steel.

It is thus a feature of at least one embodiment of the invention to provide high heat collection within the plates. The material of the plates may provide high thermal conductivity and emissivity.

The shelves may have an upper surface opposite a lower surface and at least one of the upper surface and lower surface has ribs extending along a length of the shelves.

It is thus a feature of at least one embodiment of the invention to increase the surface area of the plates allowing heat to flow into and be stored within the plates.

A port may have an asymmetrically offset opening allowing heated air to flow from the interior cooking cavity back to a chamber carrying the blower. The port opening may be D-shaped.

It is thus a feature of at least one embodiment of the invention to provide turbulent airflow within the cooking cavity.

The blower may have a power output of 0.25 horsepower or 180 watts.

It is thus a feature of at least one embodiment of the invention to provide high air flow within the cooking cavity for circulating hot air to the thermal plates and all areas within the oven.

The cooking cavity may be defined by first and second sidewalls, a back wall, a ceiling and a floor made out of cast iron or steel and a front opening providing access to the cooking cavity. The cooking cavity may be made out of cast iron or steel. The door may include an inner plate made of cast iron or steel. The inner plate may have an areal mass of at least five pounds per square foot. The inner plate may have an areal mass of at least ten pounds per square foot.

It is thus a feature of at least one embodiment of the invention to provide a single piece of solid cast material which may be substantially sealed by the door to restrict heat from flowing into and out of the cooking cavity.

An exit port may be defined by a short passage with a tapering constriction in a middle of the passage allowing heated air to flow out of the interior cooking cavity into an exhaust chamber.

It is thus a feature of at least one embodiment of the invention to constrict air flow exhaust and to retain moisture within the cooking cavity.

In an alternative embodiment of the invention a high velocity turbulent air oven includes an outer housing including a door; an interior cooking cavity including first and second sidewalls, a back wall, a ceiling and a floor being a single continuous solid cast iron or steel casting, the door closing to define an interior cooking cavity and opening to provide access to the cooking cavity through a front opening; a first and second shelves spaced in separation within the cooking cavity; a cooking cavity heater communicating with the cooking cavity to heat the cooking cavity; and a blower supported by the interior heat chamber for circulating heated air through the cooking cavity.

The blower may be positioned within a volute shaped cavity.

It is thus a feature of at least one embodiment of the invention to provide turbulent airflow within the cooking cavity.

The blower may be coupled to the first sidewall of the interior cooking cavity.

It is thus a feature of at least one embodiment of the invention to provide stabilizing attachment of the large blower without overheating the blower components.

The outer housing may be made of stainless steel.

It is thus a feature of at least one embodiment of the invention to allow the outside of the oven to be cool to the touch.

These particular objects and advantages may apply to only some embodiments falling within the claims and thus do not define the scope of the invention.

DETAILED DESCRIPTION OF THE INVENTION

Figure 1:
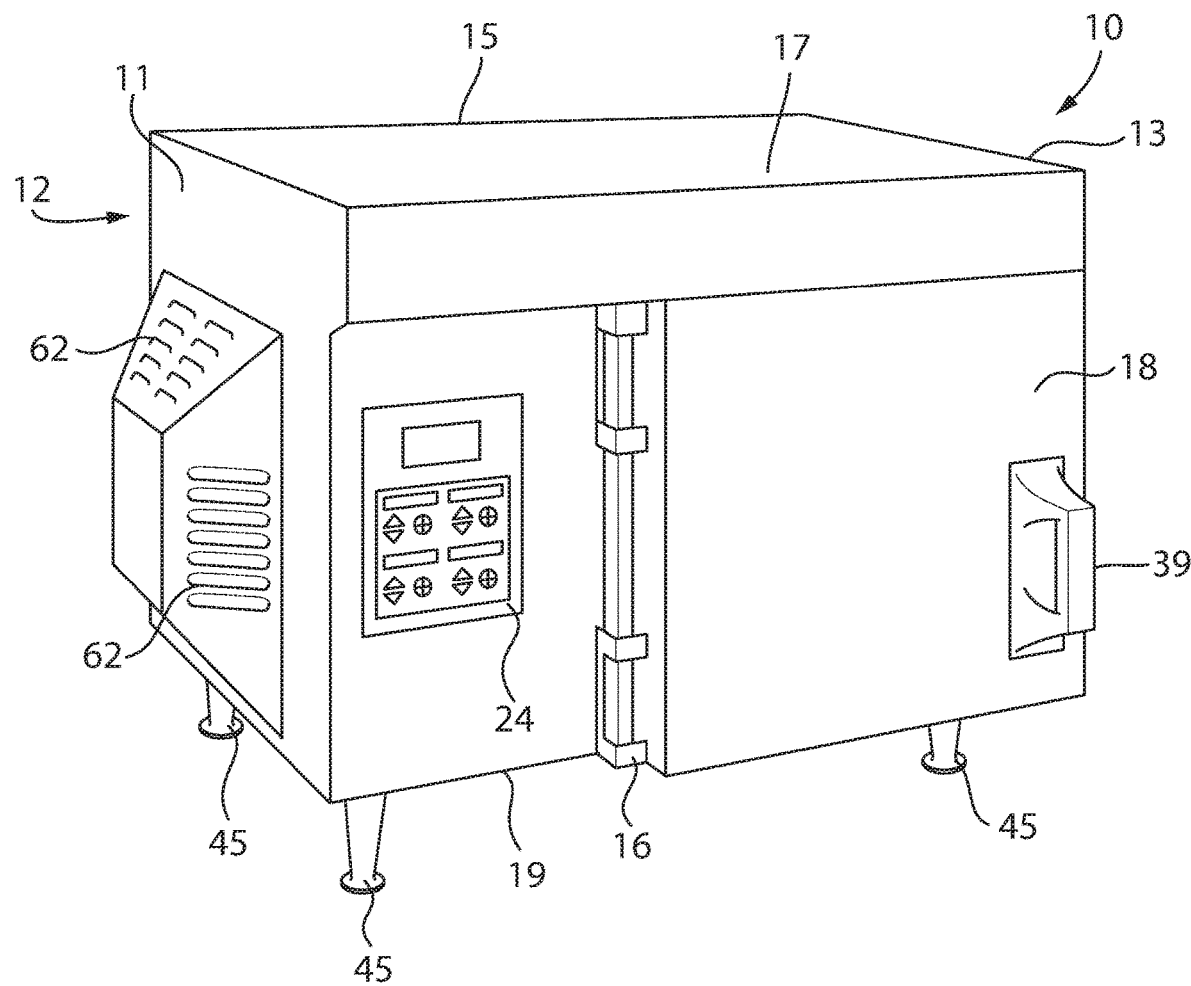
FIG. 1 is a left side perspective view of the outside of the cooking oven of the present invention, showing the outer housing having a door closeable over a front opening, a user interface, and blower air vents.
Figure 2:
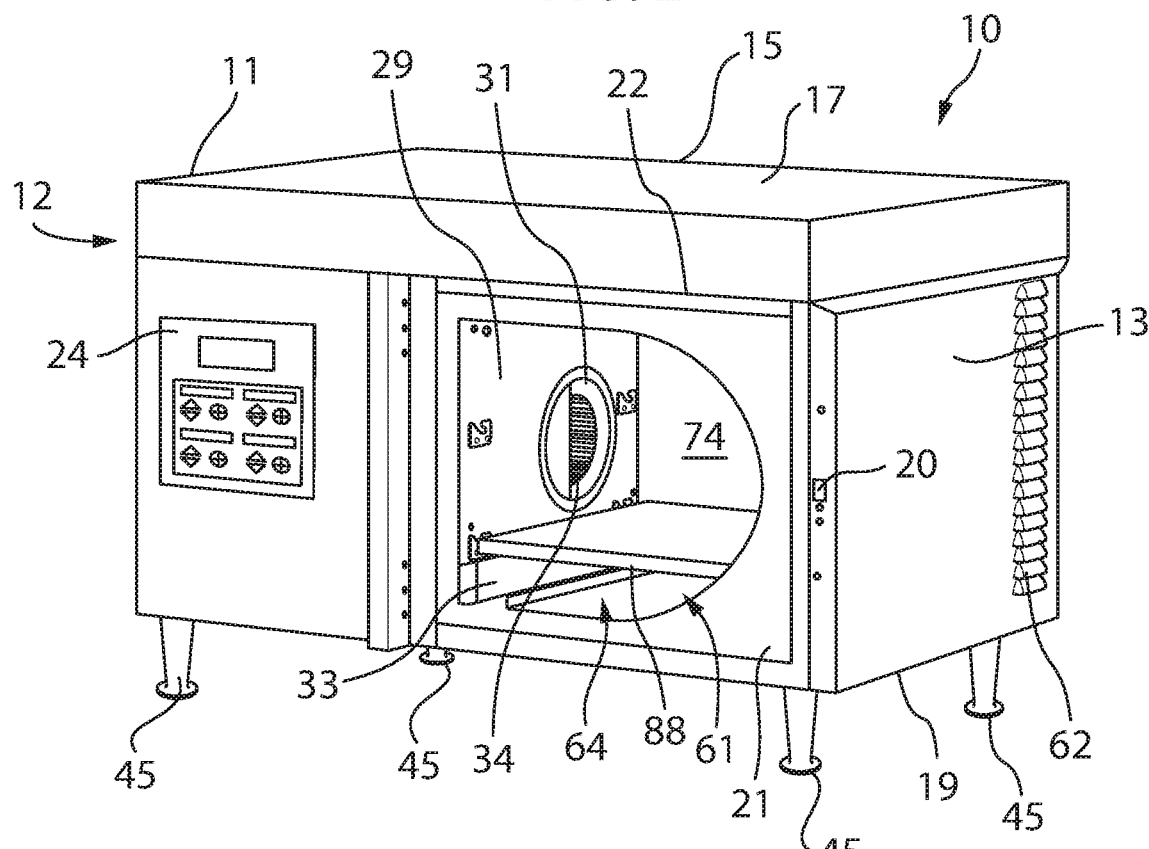
FIG. 2 is a right side perspective view of the oven of FIG. 1 with the door removed and showing the inner cavity having one oven rack installed therein and a D shaped inlet port leading to a heating chamber holding a blower.

Referring now to FIGS. 1 and 2, a high velocity turbulent air oven 10 according to one embodiment of the present invention may provide a housing 12. The housing 12 may include left and right vertically opposed sidewalls 11, 13, a rear vertical sidewall 15 extending along a rear edge of the sidewalls 11, 13, a ceiling 17 extending horizontally across a top edge of the sidewalls 11, 13, 15 and a floor 19 extending horizontally across a bottom edge of the sidewalls 11, 13, 15. The oven housing 12 may be internally divided into an equipment compartment 23 and an oven chamber 14. The oven chamber 14 may be divided by separation panel 29 into a heating cavity 27 and a cooking cavity 64 with sidewalls of the cooking cavity 64 holding cooking racks or plates 88 supporting food directly (see FIGS. 4 and 5) as will be further described below.

The cooking cavity 64 may be accessed through a door 18 connected by a hinge 16 at one vertical side of the cooking cavity 64. The door 18 may close over the cooking cavity 64 during the cooking operation as held by a latch assembly 20 (visible on the cooking cavity 64 only). In the closed position, the door 18 may be substantially sealed against the cooking cavity 64 by compressing a gasket 22 surrounding a front rectangular opening 21 of the cooking cavity 64 defined by a front edge of the separation panel 29, right sidewall 13, ceiling 17 and floor 19.

The door 18 may include a handle 39 used to move the door 18 between the open and closed position pivoting about the hinge 16. Although illustrated as pivotally attached at a left side of the cooking cavity 64 it is understood that the door 18 may be hinged on the right side of the cooking cavity 64, underside, or topside in a similar manner.

The housing 12 may be supported above a horizontal support surface, such as a table or counter, by support legs 45 positioned at the respective corners of the horizontal floor 19 to elevate the housing 12 above the horizontal support surface.

Figure 4:
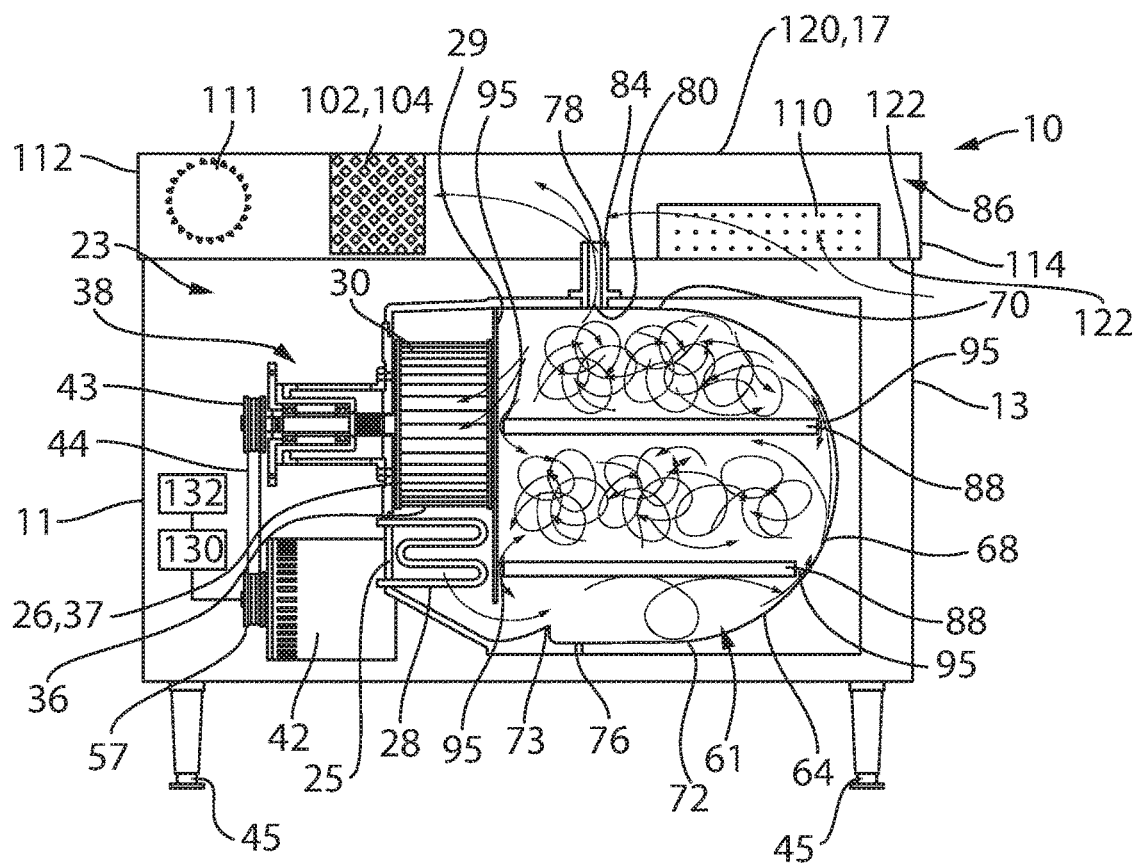
FIG. 4 is a front view of the oven of FIG. 1 with the exterior housing of the oven removed to show various components of the heating cavity and cooking cavity.

Referring also to FIG. 4, the equipment compartment 23 and oven chamber 14 may share and be opposed across a divider wall 25 substantially separating the two compartments and normally parallel to but spaced between the external vertical sidewalls 11, 13 of the respective compartments.

The equipment compartment 23, in the illustrated embodiment, is positioned to the left side of the oven chamber 14 and supports on a front exposed wall of the equipment compartment 23 a control panel 24 accessible by a user standing at a front of the oven 10. The control panel 24 may provide conventional electronic controls such as switches, buttons, a touchscreen or the like that may receive oven control data from the user. For example the user interface may allow an operator to control and monitor the temperature of the oven, set and monitor cooking times, initiate a self-cleaning cycle, and the like.

Figure 3:
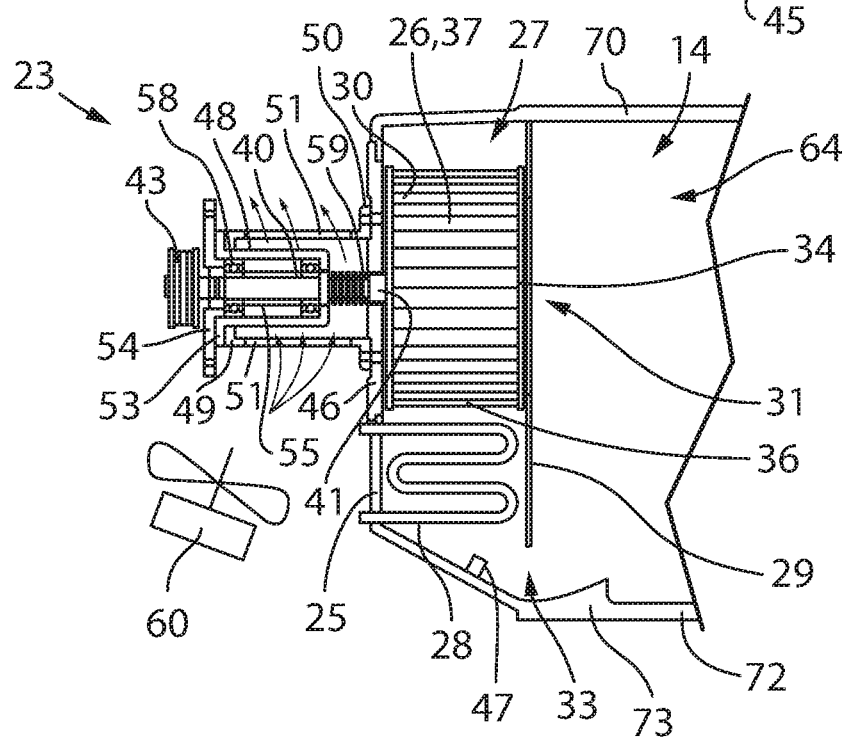
FIG. 3 is a partial front view of the interior of the oven showing a fan housed within the heating chamber and a drive assembly housed within an equipment chamber.

Referring now to FIGS. 3 and 4, an electric motor 42 may be positioned on one side of the divider wall 25 in the equipment compartment 23 to communicate with a motor-driven blower 26 positioned on the other side of the divider wall 25 within the oven chamber 14. The motor-driven blower 26 may be positioned in the heating cavity 27 on the left side of the oven chamber 14 adjacent to the equipment compartment 23 and toward a rear of a heating cavity 27. The blower 26 is separated from the cooking cavity 64 by the separation panel 29 directing air flow between the heating cavity 27 and the cooking cavity 64.

The heating cavity 27 may form a volute shaped cavity having a spiral form spiraling forwardly with an enlarged discharge opening 35 extending forwardly in a downward direction toward the front of the heating cavity 27. The motor-driven blower 26 may be positioned within the spiral center of the heating cavity 27 to direct a stream of air around the spiral form of the volute cavity and across heater elements 28 extending at least partially around the blower 26 within the volute shaped cavity and downward toward the discharge opening 35. The heater element 28 may be an electric heating element or a heat exchanger receiving heat from a gas flame/burner or the like and may surround the blower 26. In one embodiment, the heating element 28 may be electric resistance heaters, the temperature of which is a function of electric current flowing therethrough. The heater element 28 may be a 3000 to 4000 watt heater or an at least 3200 watt heater. The heater element 28 may be separate heating elements, such as three separate heating elements, each being an 1820 watt heater. The elements may be bent in a serpentine pattern and placed to maximize the surface contact area of each heating element with respect to the passing air stream.

In one embodiment, the heater element 28 may not be operated and the cooking cavity 64 may be heated by operating of the motor-driven blower 26 only. Through air friction provided through the blower 26, the cooking cavity 64 may heat up to about 150 degrees Fahrenheit or greater without turning on the heater element 28. In this manner, food can be cooked with the "Sous-vide" method which cooks food in a temperature-controlled environment for longer than normal cooking times at an accurately regulated temperature which is lower than normally used for cooking.

In one embodiment, the heating cavity 27 may have a volume of approximately 440 in.$^3$ and an interior surface area of approximately 400 in.$^2$. The ratio of the volume of the cooking cavity 64 to the heating cavity 27 may be 4.5 to 6.5 to 1. The blower 26 may be a centrifugal fan with a fan wheel 37 having rotating impellers 30 for moving air or other gases through a drum shaped fan housing 32. The fan wheel 37 consists of a hub 41 on which a number of rotating impellers 30 are attached. The rotating impellers 30 may be forward curved, backward curved, or radial. Air passes into the fan housing 32 through an inlet duct 34 at a center opening of the fan housing 32 and engages with the rotating impellers 30 of the fan wheel 37 which moves the air circumferentially around the drum shaped fan housing 32 and out through an outlet duct 36 of the fan housing 32 allowing air to escape the fan housing 32 and enter the discharge opening 35. Rotation of the fan wheel 37 creates a vacuum at the center opening of the fan housing 32 that continuously draws more air into the heating cavity 27.

The speed of the rotating impellers 30 may be determined by a drive mechanism 38 having a drive shaft 40, on which the hub 41 of the blower 26 turns, coupled directly or indirectly to the electric motor 42. In the embodiment shown, the drive mechanism 38 is a belt drive system where the drive shaft 40 is rotated by a belt 44 looped around one or more pulleys 43 rotating with the drive shaft and a rotating shaft 57 of the electric motor 42, to transmit the mechanical energy from the electric motor 42 to the fan wheel 37. In an alternative embodiment, the drive mechanism 38 is a direct drive system where the drive shaft 40 is driven directly by the electric motor 42 without the use of pulleys 43 and belts.

The drive mechanism 38 may be mounted indirectly to the divider wall 25 along a serpentine path to provide stabilization of the high-powered blower 26 while keeping the drive mechanism 38 separated from the divider wall 25 to keep it cool. In the embodiment shown, the drive shaft 40 extends leftward from the fan wheel 37 through the divider wall 25 having the pulley 43 extending at a distal end of the drive shaft 40. The drive shaft 40 may include outwardly protruding fins 59 increasing the surface area of the drive shaft 40 so as to enhance the heat dissipation of the shaft 40.

A mounting plate 46 may be coupled to the divider wall 25 being a poorly thermally conductive material such as stainless steel so as to not transmit the heat retained by the divider wall 25. A bearing housing mount 49 may be coupled to the mounting plate 46 for example having an outwardly projecting flange 50 facilitating attachment of the bearing housing mount 49 to the mounting plate 46 and extending outwardly therefrom along the length of the drive shaft 40. The bearing housing mount 49 may have openings 51 formed along a body of the mount 49 extending along the length of the drive shaft 40 so that cooling air may pass over the drive shaft 40. The bearing housing mount 49 may be enclosed toward a distal end of the drive shaft 40 by an end plate 54. The end plate 54 may be an enlarged covering enclosing the distal end of the bearing housing mount 49 while also retaining a mounting flange 53 of the bearing housing 48 between the bearing housing mount 49 and the end plate 54.

The bearing housing 48 surrounds the drive shaft 40 inside the bearing housing mount 49 and is coupled to the end plate 54 rather than the mounting plate 46 which can reach high temperatures during cooking. The bearing housing 48 includes a flanged end 53 secured between the bearing housing mount 49 and the end plate 54 and extending inside the bearing housing mount 49 such that the bearing housing mount 49 is spaced inwardly from the bearing housing mount 49 allowing air to fill the area around the bearing housing 48.

An interior of the bearing housing 48 may support bearings 58 extending around the drive shaft 40 and allowing rotational motion of the drive shaft 40 while also reducing friction. The bearings 58 may be separated along the drive shaft 40 by a bearing spacer 55. The bearings 58 may be sleeve ring oil bearings, air bearings or magnetic bearings known in the art. The bearing housing 48 may be made of aluminum alloy.

The drive shaft 40 extends through the end plate 54 to provide an exposed distal end on which a pulley 42 is mounted. The pulley 43 extends outwardly therefrom so that the flexible belt 44 may be looped therearound to translate motion from the electric motor 42. The belt 44 may be looped around one or more additional pulleys (not shown) located between the electric motor 42 and the pulley 43. The belt 44 is looped around the rotating shaft 57 of the electric motor 42, disposed below the drive mechanism 38 within the equipment compartment 23, which produces the mechanical energy.

In one embodiment, the blower 26 may have a power of 0.25 horsepower or 780 W. The blower 26 may have a weight of 2.3 pounds.

A cooling fan 60 may be positioned within the equipment compartment 23 to direct air over the drive mechanism 38. Additional fans can be used to cool the drive mechanism 38 or bearing housing 48 as desired. For example, a cooling fan may be positioned near the ceiling of the equipment compartment and include an inlet port that draws air in just above the control panel 24 and blows the air downward via a cooling duct to the bearing housing 48. The use of cooling fans and air ducts may eliminate the need for side panels with vents to provide a zero clearance installation for placement of the oven 10 close to adjacent appliances. In an alternative embodiment, as seen in FIG. 1, the left sidewall 11 may include vents or openings 62 through which air may pass between an exterior of the housing 12 and an interior of the housing 12. These vents or openings 62 may also be found in the right sidewall 13 of the housing 12 and/or the rear vertical sidewall 15.

The electric motor 42 may be operated by a controller 130 providing a computer processor and associated memory and executing a program stored in associated memory. Executing the program may generate control signals output by interface circuitry of the controller 130 to components of the oven 10 and read sensed signals from the user and various sensors within the oven 10. For example, the controller 130 may receive signals relating to the door position which allows the electric motor 42 to operate when the door 18 is closed and stops motor 42 operation when the door 18 is open. In a similar manner, the heating element 28 may be turned on when the door 18 is closed and may be turned off when the door 18 is open. The controller 130 may receive signals when the door 18 is opened to output convection control signals to the motor 42 operating the blower 26 and heat power signals to a heater controller 132 controlling heating elements 28 to control a temperature within the oven 10 where the use of temperature sensors would be too delayed. The controller 130 may also receive signals from the control panel 24 providing user commands. The controller 130 may also sense the quantity of food placed in the cooking cavity 64 and adjust the heating cycle to accommodate the quantity of food product in the oven 10.

A diverter 47 may be positioned in the floor of the heating cavity 27 to split the air flow, for example, between the cooking cavity 64 and the door 18. In one embodiment, the majority of the air may be diverted to the door 18.

Referring to FIGS. 2, 3 and 4, the separation panel 29 between the heating cavity 27 and the cooking cavity 64 has openings allowing air or gas to communicate therebetween. The separation panel 29 has an inlet port 31 positioned adjacent to the inlet duct 34 of the fan housing 32 so that air may be directed into the inlet duct 34 of the blower 26. The inlet port 31 may be positioned such that air is drawn into the eye of the fan wheel 37 from both above and below the port 31 (e.g., from above and below the top shelving) to improve uniformity of heat distribution.

The inlet port 31 may be an asymmetrically offset opening, for example, resembling the letter-D with the flat side of the D substantially perpendicular to the oven floor and oriented toward the outlet side of the heating cavity 27 with the fan wheel 37 rotating counterclockwise when viewed through the D. The portion of the otherwise circular port 31 that is blocked to form the letter-D is approximately 30 to 35% of the port 31 area. The inlet port 31 may have a cross-sectional area of 15.5 in.$^2$.

The separation panel 29 provides an outlet port 33 by leaving a rectangular opening between the heating chamber volute and the cooking cavity 64. The outlet port 33 positioned at the bottom end of the panel 29 allows heated gas or air to exit the heating cavity 27 and travel into the cooking cavity 64. The outlet port 33 may be a rectangular slot generally corresponding to a bottom portion of the separation panel 29. The outlet port 33 may have a cross-sectional area of 15.5 in.$^2$. The inlet port 31 and outlet port 33 may be proportional or similar in cross-sectional area.

The oven chamber 14 may include a singular, continuous piece of a high thermal mass material (such as cast-iron, concrete, brick, fireclay or granite) defining a mixing manifold that is rigidly coupled to the outer housing 12 and substantially sealed when the door 18 (also containing a plate of high thermal mass material) is closed against the cooking cavity 64. The oven chamber 14 may be defined by a left wall being the vertical divider wall 25 extending opposite a right side having a curved wall resembling the curved interior of a cylinder with the ends of the cylinder at the front and back of the cooking cavity 64. The curved interior is formed by a right sidewall 68 having a reversed C-shaped when viewed from the front. A top wall 70 and bottom wall 72 extending horizontally from a top edge and bottom edge, respectively, from the sidewalls 25, 68 may also be slightly curved on the right side so that a rear wall 74 of the cooking cavity 64 is generally D-shaped corresponding to the rear edges of the left sidewall 66, right sidewall 68, top wall 70, and bottom wall 72 and the front opening 61 of the cooking cavity 64 is also D-shaped when viewed from the front. The curved interior of the cooking cavity 64 assists in directing air from the outlet port 33 circumferentially around the inner circumference of the cooking cavity 64 and back into the inlet port 31.

Generally, the casting of the oven chamber 14 may be more massive than the walls of a typical oven and in one embodiment is constructed of approximately half inch or 5/16" thick cast iron or steel. The oven chamber 14 walls may have an areal density 138 of ten to fifteen pounds per square foot or approximately twelve pounds per square foot or approximately thirteen pounds per square foot. Specifically, the casting of the oven chamber 14 may have a weight of 90 pounds. The thickness of the walls 66, 68, 70, 72 may be approximately 0.15 to 0.5 inches or approximately 0.3 inches or approximately 0.5 inches. The walls 66, 68, 70, 72 may be approximately 5/16 inches thick except near the front opening 61 which is thicker. The rear wall 74 may be approximately 7/16 inches thick.

Figure 7:
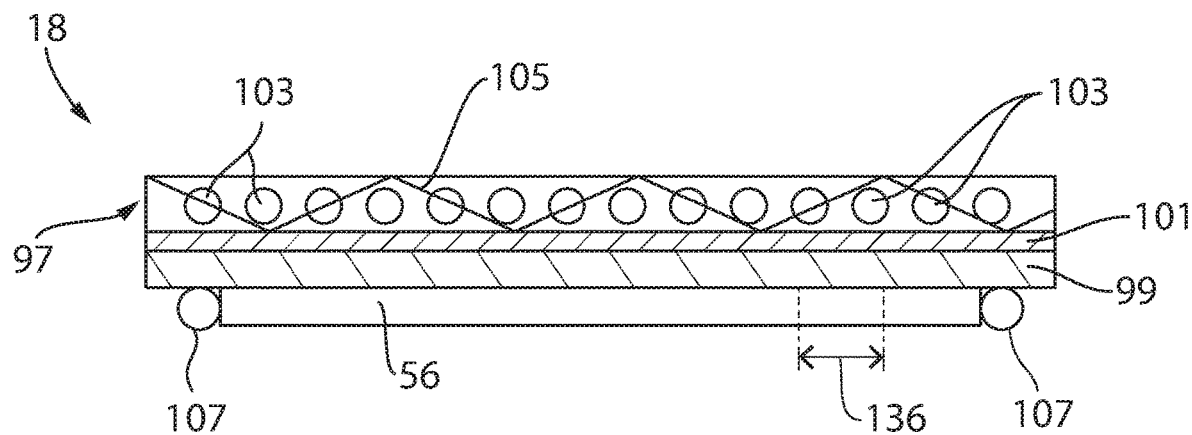
FIG. 7 is a simplified schematic of a cross sectional view of the door of the oven.

Referring to FIG. 7, an interior of the door 18 may include a rectangular plate 56 (or other shaped plate corresponding to the shape of the front opening 61 of the cooking cavity 64) of high thermal mass material so that when the door 18 a sealed over the front opening 21 of the cooking cavity 64, the door 18 along with the sidewalls of the cooking cavity 64 substantially seal the cooking cavity 64. Generally, the door plate 56 may be more massive than the door of a typical oven and in one embodiment is constructed of ¼ inch thick cast iron or steel. The door plate 56 may have an areal density 136 of five to ten pounds per square foot or approximately seven or nine or ten pounds per square foot. Specifically, the rectangular plate 56 may be about 14.5 inches by 14.5 inches. The thickness of the plate 56 may be approximately between 0.15 to 0.5 inches or between 0.2 to 0.4 inches or approximately 0.25 inches or approximately 0.5 inches. The plate 56 of the door 18 may be approximately 10 pounds.

The oven chamber 14 acts as a heatsink that absorbs and radiates heat for more efficient use of energy consumed by the oven 10 and can provide a cooking temperature that is less prone to large fluctuations, for example, when the oven door 18 is opened and closed. In one embodiment, the cooking cavity 64 may have a height of approximately 12.5 inches, a width of approximately 12.5 to 15 inches, and a depth of approximately 15 inches. The cooking cavity 64 may have a volume of 2000 in.³ to 2600 in.³ and the interior surface of the cooking cavity 64 may be 950 in.² to 1100 in.².

Figure 5:
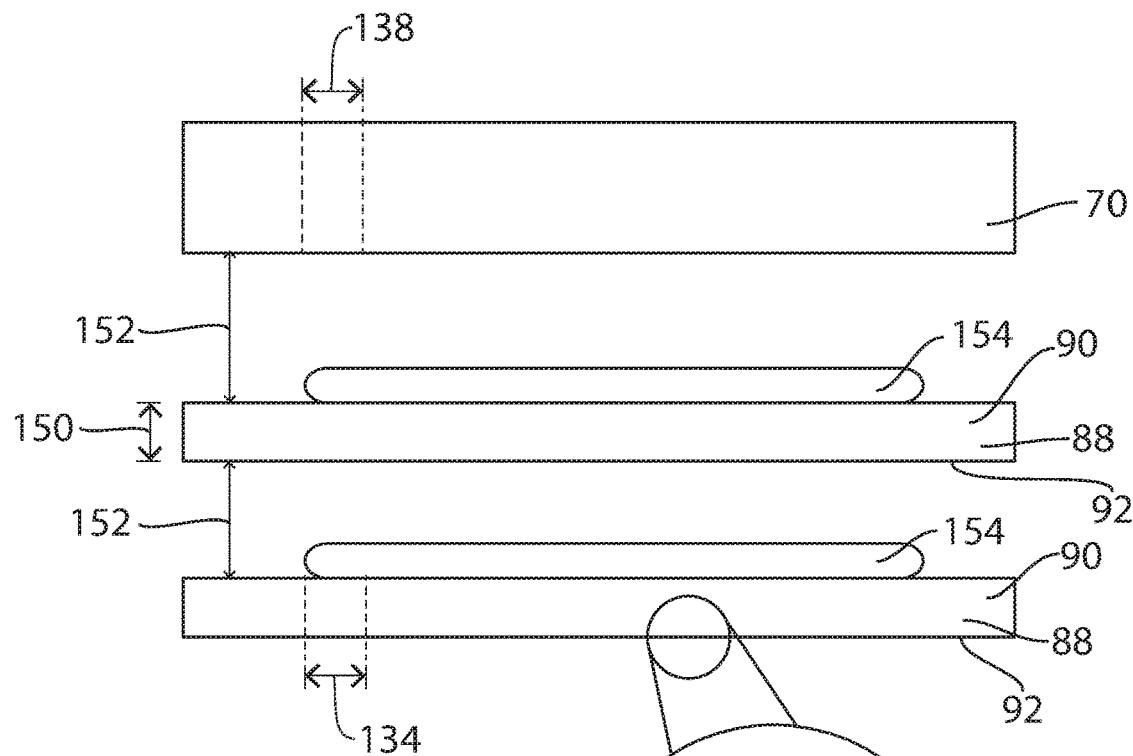
FIG. 5 is a simplified schematic of a front view of the oven showing parts of the cooking cavity including the ceiling and oven racks installed within the cooking cavity and the ribs of the oven racks shown enlarged.

Referring to FIGS. 4 and 5, installed within the cooking cavity 64 are a plurality of high thermal mass plates 88 extending laterally between the separation panel 29 and the right sidewall 68 to form oven shelving. Generally, the shelves are far more massive than found in the typical oven and in one embodiment are constructed of half inch thick cast iron or steel. Generally the shelves provide an areal density 134 of no less than eight pounds per square foot or at least more than six pounds per square foot. The plates 88 may have an areal density 134 of five to ten pounds per square foot or approximately seven pounds per square foot or approximately nine pounds per square foot. Specifically, the plates 88 may be solid rectangular plates having a width extending between the separation panel 29 and right sidewall 68 of approximately 11.5 inches and a depth extending between the front opening 61 and the rear wall 74 of approximately 14 inches. The plates 88 may have a thickness 150 defined between a first surface 90 and a second surface 92 that is approximately between ⅜ and ⅝ inches or approximately 0.5 inches. The plates 88 may have a weight of about 10 pounds per plate or between 10 and 12 pounds per plate. An upper plate may be 11 pounds and a lower plate may be 10.5 pounds. The upper plate 88 may be heavier than the lower plate 88.

Cast-iron has a thermal conductivity of approximately 55 Wm-1K-1 and an emissivity coefficient ε of 0.44 for raw cast-iron and the shelves are ideally constructed of a material having at least 70% of these values of thermal conductivity and emissivity. For example, cast-iron may be replaced with steel which has a thermal conductivity of approximately 50 Wm-1K-1 and an emissivity coefficient ε of 0.59 for stainless steel.

The plates 88 may be sized so that they may fit above and below the vertical center of the cooking cavity 64. In this respect, plates 88 of a similar size may be installed above and below the vertical center of the cooking cavity 64 at a similar distance from center. The placement of the plates 88 may be installed with respect to their relative vertical position with respect to the inlet port 31 and outlet port 33. For example, a top plate 88 may be installed so that it is centered with the vertical center of the inlet port 31. A bottom plate 88 may be installed below the inlet port 31 and above the outlet port 33. The plates 88 may also extend substantially the entire depth of the cooking cavity 64 being approximately 15 inches but still allowing some clearance for closure of the door 18 over the front opening 61. In this respect, the plates 88 are spaced and suspended without disrupting the necessary air flow through the inlet port 31 or outlet port 33.

A first surface 90 of the plates 88 may be substantially smooth and an opposite parallel second surface 92 of the plate 88 may include laterally extending ribs 94 to increase the surface area of the plate 88 thereby significantly enhancing the transfer of heat from the circulating air to the plates 88. The ribs 94 may be formed by spaced apart, parallel depressions 96 having a semi-circular cross section or rectangular channels with radii in the inner corners formed along the second surface 92 between opposing edges of the second surface 92 leaving upwardly extending ribs 94 therebetween. The ribs 94 may have a height of approximately 0.25 inches to 0.75 inches or approximately 0.25 inches with respect to the depression 96. The ribs 94 may be pointed or blunted at the upper tips. The plate 88 may be reversible such that food 154 may be placed on the smooth surface 90 or the ribbed surface 92 as desired. For example it may be desired to place pizza and flatbread on the smooth first surface 90 and meats and vegetables may be cooked on the ribbed surface 92. The surfaces of the plates 88 may also include a non-stick coating or other suitable coating.

Figure 8:
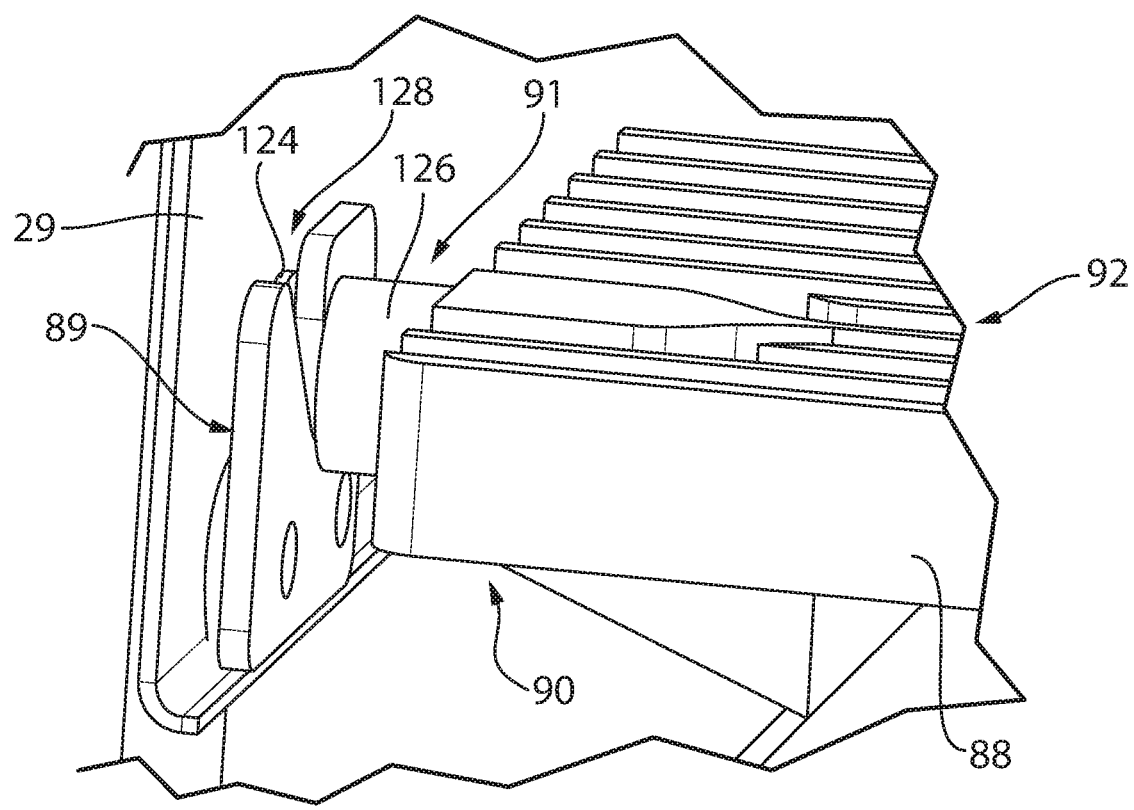
FIG. 8 is an isometric view showing a mounting pin of the oven racks engaged with a mounting bracket attached to a wall of the cooking cavity.

Referring to FIG. 8, the left side of the plate 88 may include outwardly protruding mounting pins 91 which engage with shelving supports 89 of the separation panel 29 allowing the plates 88 to rest and be supported thereon. The pins 91 may include a large diameter head 124 extending from a narrower shaft 126 coupled to the plate 88 such that the narrower shaft 126 is inserted into a hole opening 128 of the shelving supports 89 with the head 124 extending on the opposite side of the supports 92 toward the separation panel 29 from the plate 88. The right side of the plate 88 may also include outwardly protruding fingers (not shown) which are curved to engage the right sidewall 68 directly to form a cantilever or may also engage shelving supports (similar to the left side) to be coupled to and/or rest thereon.

Referring again to FIG. 5, the plate 88 may be spaced in separation such that a lower shelf is approximately 2 inches to 10 inches or less than 8 inches or less than 6 inches from an upper shelf, and the upper shelf is approximately 2 inches to 10 inches or less than 8 inches or less than 6 inches from the top wall 70. It is understood that if additional shelving is added that the space 152 provided between respective shelving is approximately 2 inches to 10 inches or less than 8 inches or less than 6 inches, and the space 152 between the uppermost shelf and the top wall 70 is also approximately 2 inches to 10 inches or less than 8 inches or less than 6 inches. Cooking regions may be defined above each of the plate 88 where radiant heat from the upper plate 88 will help to cook the lower food product 154. The cooking regions form substantially semi-sealed cooking areas when the door is closed which heat the food to the same temperature consistency.

When the plate 88 is installed within the cooking cavity 64, a gap 95 may be provided between the plate 88 and the cooking cavity 64 walls to allow for effective air circulation around the plates 88. For example, the gap 95 may exist around all four sides of the plates 88 (excluding the mounting pins 91 or protruding fingers). The size of the gap 95 between the plate 88 and the cooking cavity 64 walls may be adjusted to adjust the temperature in the regions above each plate 88. The size of the gap may be approximately 0 to 1 inch or 0.25 to 0.75 inches or approximately ⅝ inch or approximately ½ inch. The air flow around the gaps 95 creates dynamic high and low pressure areas. In some embodiments the plate 88 may be positioned against the cooking cavity 64 walls with essentially no gap.

The walls of the cooking cavity 64 and the plates 56, 88 may be a high thermal mass material that can tolerate high temperatures (e.g., 850° or more), is dimensionally stable, and resists warping. The high thermal mass material is characterized as having a high density and high specific heat capacity. Various exemplary embodiments of the high thermal mass material are described here. The high thermal mass material may be a refractory material such as fireclay brick, high alumina, silica brick, magnesite, dolomite, chromite, zirconia, and monolithic refractories. The high thermal mass material may be a cast iron having a density of 7200 kg/m3 and a specific heat of 460 J/kg° C. The high thermal mass material may be brick having a density of 1969 kg/m3 and a specific heat of 921 J/kg° C. The high thermal mass material may be fireclay having a density of 2100-2600 kg/m3 and a specific heat of 1000 J/kg° C. The high thermal mass material may have a density of approximately 1500 to 7500 kg/m3 or greater than 1500 kg/m3 or greater than 7000 kg/m3. The high thermal mass material may have a specific heat of approximately 500 to 1000 J/kg° C. or at least 500 J/kg° C. or at least 900 J/kg° C.

Any of the walls of the cooking cavity 64 or any of the plates 56, 88 may have an areal density of five to twenty pounds per square foot or at least ten pounds per square foot or at least fifteen pounds per square foot. For example the sidewalls may have an areal density of about 13 pounds per square foot. The rear wall may have an areal density of about 18 pounds per square foot. The rear wall may have an areal density that is greater than the other sidewalls.

Referring to FIGS. 3 and 4, the bottom wall 72 of the cooking cavity 64 may include a ramp 73 having a lower end extending from the outlet port 33 of the separation panel 29 and angled upwardly toward the right sidewall 68 to create turbulence within the cooking cavity 64. The bottom wall 72 may also have small circular drainage port 76 extending through the floor 19 of the housing 12 to the exterior of the housing 12 allowing the cooking cavity 64 to drain oils and liquids into a drip pan (not shown) positioned below the housing 12. Small quantities of air may also be drawn into an out of the cooking cavity 64 through the drainage port 76. The drainage port 76 may be inset within an elongated divot (not shown) extending along the bottom wall 72 between the front opening 61 and the rear wall 74.

The top wall 70 of the cooking cavity 64 may carry a venturi port 78 having a first cylindrical end carried by an opening 80 within the top wall 70 and extending to a constricted section 82 which then broadens to a second cylindrical end having an opening 84 extending into an exhaust chamber 86 located above the oven chamber 14 and equipment compartment 23. The venturi port 78 allows air and gas to flow out of the cooking cavity 64 into the exhaust chamber 86 and to exit the housing 12 at a metered pace which is controlled by the shape and size of the venturi port 78. The venturi port 78 also assist in the regulation of moisture content within the cooking cavity 64. The venturi port 78 may have a cross-sectional area of 0.32 in.$^2$.

Figure 6:
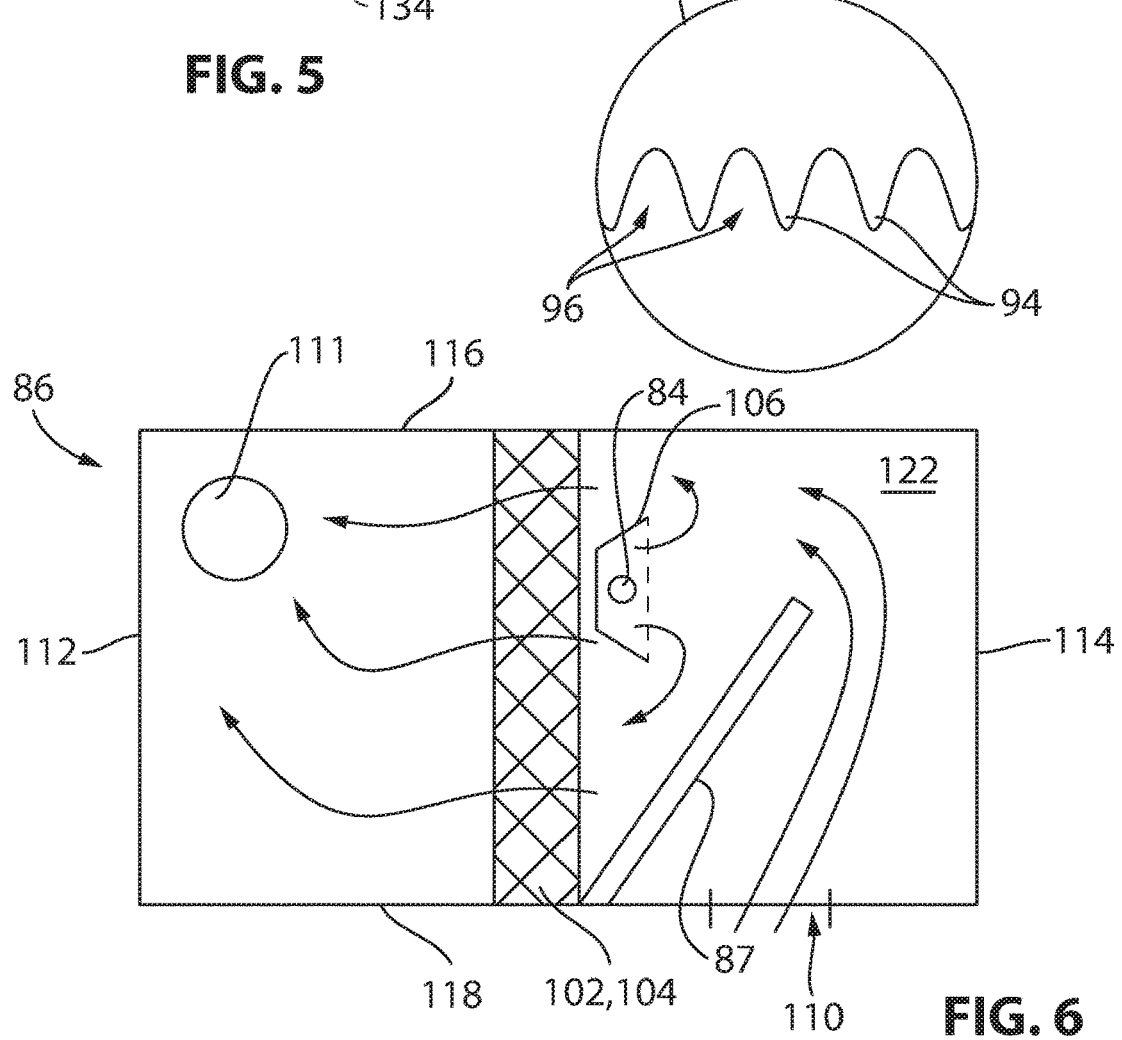
FIG. 6 is a simplified schematic of a top elevation view of an exhaust chamber of the oven.

Referring to FIGS. 4 and 6, the exhaust chamber 86 allows for the exhaust of gas and air from the cooking cavity 64 and for the intake of ambient air through an intake port 110. The exhaust chamber 86 includes a left 112 and right 114 vertical sidewalls generally corresponding with the left and right sidewalls 11, 13 of the housing 12, a rear vertical sidewall 116 generally corresponding with the rear vertical sidewall 15 of the housing 12, a front vertical sidewall 118 generally corresponding with the front of the housing 12, and a horizontal floor 122 generally corresponding with the ceiling of the oven chamber 14. A horizontal cover 120 generally corresponding with the ceiling 17 of the housing 12 encloses the upper opening of the exhaust chamber 86. The perimeter of the horizontal cover 120 may include a downwardly extending flange overlapping the top edges of the sidewalls 112, 114, 116, 118 to enclose the exhaust chamber 86.

The exhaust chamber 86 may be separated by a divider wall 102 extending between the front and rear sidewalls 116, 118 and carrying a filter 104 therein. A right side of the exhaust chamber 86 to the right of the divider wall 102 primarily located above the oven chamber 14 includes a hole 85 in the floor 122 of the exhaust chamber 86 allowing the venturi port 78 to extend therethrough. Hot air emerging from the venturi port 78 travels into the exhaust chamber 86 and contacts an air deflector 106 directing the air away from the filter 104 and dispersing the hot air within the exhaust chamber 86 so that it is dispersed across the entire length of the filter 104 rather than passing through a small area of the filter 104.

Intake air may also come into the exhaust chamber 86 through an intake port 110 allowing air to pass from outside the oven chamber 14 (or from air passing through the door 18) through slots or openings in the horizontal floor 122 of the exhaust chamber 86 (above the door 18 which is sealed). The intake port 110 may have a cross-sectional area of 40 in.$^2$.

The right side of the exhaust chamber 86 may include a diverter panel 87 extending from the front sidewall 118 and angled rearwardly toward a right side of the exhaust chamber 86 to direct the intake air entering through the intake port 110 away from the filter 104 so that it passes over and around the opening 84 of the venturi port 78.

The hot air passing from the cooking cavity 64 and the cool intake air may flow through the divider wall 102 and filter 104 to pass to a left side of the exhaust chamber 86 primarily located above the equipment compartment 23 and carries an exhaust fan 111 expelling the air from the exhaust chamber 86 to the exterior of the housing 12. The mixture of the cool intake air with the small amount of heated air results in a lower temperature exhaust, for example, in the range of about 100° F. to 110° F. in the most cooking situations.

Referring to FIG. 7, the door 18 may include a number of layers assisting with the retention of heat within the cooking cavity 64 while keeping an exterior of the door 18 cool to the touch. A door casing 97 may be a stainless steel material enclosing layers within. The high thermal mass inner door plate 56 may be mounted on an exterior surface of the door casing 97 extending into an interior of the cooking cavity 64 and be surrounded by a gasket 107 to create a sealed cooking cavity 64 as described above. The door casing 97 also contains a number of insulating layers starting with a first thermal barrier layer 99 extending adjacent to the door plate 56 and having one or more layers of thermal insulation (such as ceramic insulation material) and optionally an air gap. Moving outwardly from the thermal barrier layer 99 is a layer of bulkhead 101 separating the thermal barrier layer 99 from a layer of vertically oriented channels 103 extending along the door casing 97 and allowing air to be drawn therethrough. The series of vertically oriented channels 103 may be subdivided along a vertical height of the door 18 by corrugated or zigzag baffle plates 105. The baffle plates 105 stop short of the top and bottom edges of the door casing 97 creating an inlet plenum at the bottom of the door 18 and an outlet plenum at the top of the door 18. Air flowing through the channels 103 is heated by the door plate 56 and exits the door casing 97 through the outlet plenum at the top of the door 18 which is then drawn into the exhaust chamber 86.

It is understood that the oven housing 12 material may be a stainless steel separated from the cooking cavity 64 and equipment compartment 23 by insulation material (such as ceramic wool or glass wool) cooling the outer housing 12.

In operation, the cooking cavity 64 of the oven 10 may be heated by operating the high-powered blower 26 and heating elements 28 to heat the air within the cooking cavity 64 and circulate it therethrough. Air may be directed through the heating cavity 27 at speeds of about 90 km/h (25 m/s). The airstream then changes direction by 90° and to exit through outlet port 33. Some of the air gets redirected to the cooking cavity 64 while some of the air gets directed to the inlet plenum of the door 18. The change in direction of the airstream creates an environment of highly turbulent air flow.

When a desired cooking temperature is reached, the door 18 may be opened, food placed on the plates 88 within the cooking cavity 64, and the door 18 closed. When the door 18 is opened, the high-powered blower 26 and heating elements 28 may be turned off. When the door 18 is closed, the high-powered blower 26 and heating elements 28 may resume operation to maintain the desired temperature and cooking profile within the cooking cavity 64. As the food 154 is heated, the exhaust fan 112 may draw ambient air upward through the vertically oriented channels 103 of the door 19 and into the exhaust chamber 86 and also draw air from the cooking cavity 64 through the venturi port 78 into the exhaust chamber 86.

During this operation, food can be cooked very rapidly through heat supplied by the plate 88 disposed below the food and heat supplied by the plate 88 and air above the food. For example, a pizza can be cooked at temperatures of 500 to 600° F. in one and a half to three minutes.

Figure 9:
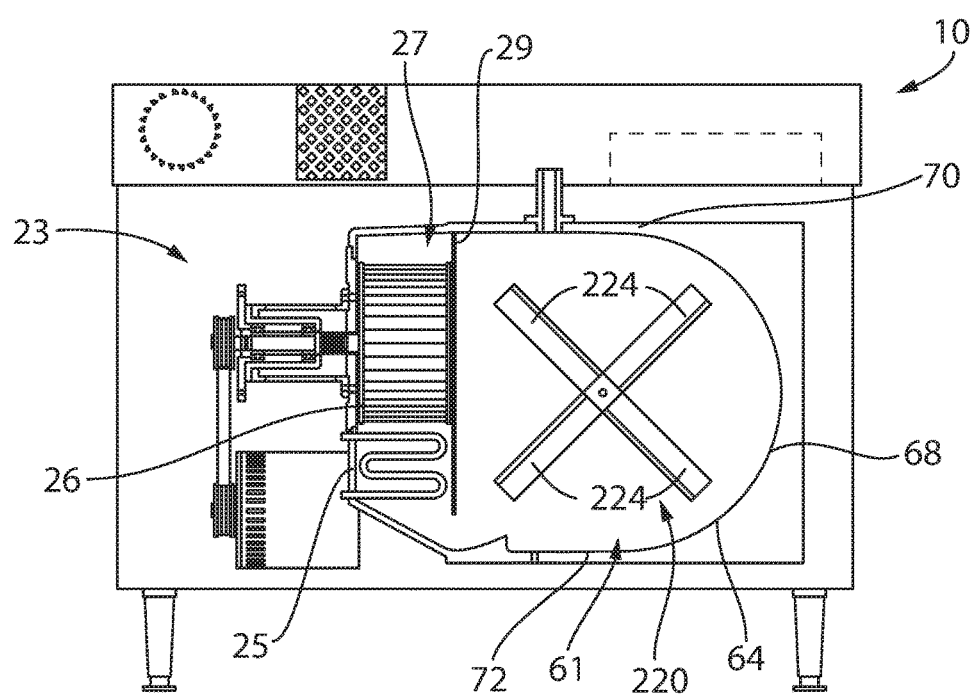
FIG. 9 is a front view of the oven of FIG. 1 with the oven racks removed and a rotating basket support assembly installed within the cooking cavity.

Referring to FIG. 9, the plates 88 may be removed from the cooking cavity 64 and a food carrying assembly 220 having food carrying baskets 224 installed within the cooking cavity 64 to allow for rotation of foods within the cooking cavity 64. The food carrying assembly 220 may be constructed as described in U.S. Pat. No. 5,148,737 hereby incorporated by reference.

The elevated temperatures can also be used to clean the interior of the cooking cavity 64 without adverse effects on the operation of the motor 42. The cleaning process may involve raising the oven temperature to about 850° F. for 2 to 4 hours to incinerate food particles and/or grease in the cooking and heating chamber. The oven 10 may be self-cleaned without the use of harsh chemicals.

It is understood that the term "air" as used herein generally refers to a fluid that contains air that may be entering, exiting or circulating within the oven. The fluid may further contain or may pick up during its movement through the oven, moisture, other gases or vapors, droplets of liquid and/or particulates, etc.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. A cooking oven comprising:
   an outer housing including a door;
   an interior cooking cavity including first and second sidewalls, a back wall, a ceiling and a floor, the door closing to define the interior cooking cavity and opening to provide access to the cooking cavity through a front opening;
   at least one shelf within the cooking cavity;
   a cooking cavity heater communicating with the cooking cavity to heat the cooking cavity; and
   a blower supported by an interior heat chamber for circulating heated air through the cooking cavity;
   wherein one of the first and second sidewalls is curved to form a cooking cavity with a D-shaped cross section.

2. The oven of claim 1 wherein one of the first and second sidewalls separates the interior heat chamber from the interior cooking cavity, and the other of the first and second sidewall is spaced from the one of the first and second sidewall and is curved away from the interior heat chamber.

3. The oven of claim 1 wherein the curved cooking cavity is configured to direct air from an outlet port of the interior heat chamber, around a circumference of the cooking cavity, and back into an inlet port of the interior heat chamber.

4. The oven of claim 1 further comprising a gap between the at least one shelf and the first and second sidewall to permit airflow through the gap and between the at least one shelf and the first and second sidewall.

5. The oven of claim 1 further comprising an outlet port allowing heated air to flow from the interior heat chamber to the interior cooking cavity.

6. The oven of claim 5 further comprising an inlet port having an asymmetrically offset opening allowing heated air to flow from the interior cooking cavity back to the interior heat chamber.

7. The oven of claim 6 further comprising an exit port defined by a short passage with a constriction in a middle of the passage allowing heated air to flow out of the interior cooking cavity into an exhaust chamber of the oven.

8. The oven of claim 1 wherein the blower has a power output of 0.25 horsepower or 180 watts.

9. The oven of claim 1 further comprising a first shelf spaced from the housing walls and horizontally disposed within the cooking cavity and a second shelf spaced from the housing walls and the first shelf and disposed within the cooking cavity and spaced in substantially parallel separation form the first shelf;

wherein the first shelf and second shelf are spaced no more than 6 inches apart.

10. The oven of claim 1 wherein the first and second sidewalls, the back wall, the ceiling and the floor, respectively, have an areal density of at least ten pounds per square foot.

11. The oven of claim 10 wherein the first and second sidewalls, the back wall, the ceiling and the floor are made out of cast iron.

12. The oven of claim 10 wherein the first and second sidewalls, the back wall, the ceiling and the floor are made out of steel.

13. The oven of claim 10 wherein the first and second sidewalls, the back wall, the ceiling and the floor, respectively, are at least 0.15 inches thick.

14. The oven of claim 13 wherein the first and second sidewalls, the back wall, the ceiling and the floor, respectively, are at least 0.3 inches thick.

15. The oven of claim 10 wherein the first and second sidewalls, the back wall, the ceiling and the floor are single continuous solid cast iron or steel casting.

16. The oven of claim 10 wherein the door has an inner plate of cast iron or steel with an areal density of at least five pounds per square foot.

17. The oven of claim 16 wherein the inner plate is at least 0.15 inches thick.

18. The oven of claim 17 wherein the inner plate is at least 0.25 inches thick.

19. The oven of claim 10 further comprising a first shelf spaced from the housing walls and horizontally disposed within the cooking cavity and a second shelf spaced from the housing walls and the first shelf and disposed within the cooking cavity and spaced in substantially parallel separation from the first shelf;

wherein the first shelf and second shelf are spaced no more than 6 inches apart.

* * * * *